United States Patent [19]

Kobayashi et al.

[11] Patent Number: 5,206,319

[45] Date of Patent: Apr. 27, 1993

[54] PROCESS FOR PREPARING A TONER RESIN, TONER RESIN PREPARED THEREBY AND TONER COMPOSITION CONTAINING PARTICLES OF THE TONER RESIN

[75] Inventors: Nobuki Kobayashi, Adrian, Mich.; Richard L. Hively, Sylvania, Ohio

[73] Assignee: Mitsui Toatsu Chemicals, Inc., Tokyo, Japan

[21] Appl. No.: 746,712

[22] Filed: Aug. 19, 1991

[51] Int. Cl.$^5$ ............................................. C08F 2/10
[52] U.S. Cl. .................................... 526/224; 526/340; 430/109
[58] Field of Search ............... 526/224; 430/109, 110

[56] References Cited

U.S. PATENT DOCUMENTS 4,469,770  9/1984  Nelson ................................ 430/110
4,473,628  9/1984  Kasuya et al. ...................... 430/109

Primary Examiner—Joseph L. Schofer
Assistant Examiner—David Wu
Attorney, Agent, or Firm—Burns, Doane, Swecker & Mathis

[57] ABSTRACT

A toner resin suitable for being used in toner compositions or developer compositions for electrostatic imaging is prepared by polymerization of styrene and butadiene in the presence of a mixture of n-dodecyl mercaptan and t-dodecyl mercaptan. The toner resin has defined weight average and number average molecular weights and a defined polydispersity that provide an improved toner resin that can be attained without blending different copolymers while using conventional apparatus. Additionally, the toner resin can exhibit a suitable melt index and glass transition temperature.

17 Claims, No Drawings

PROCESS FOR PREPARING A TONER RESIN, TONER RESIN PREPARED THEREBY AND TONER COMPOSITION CONTAINING PARTICLES OF THE TONER RESIN

BACKGROUND OF THE INVENTION

1. Field of the Invention

The present invention relates to a process for preparing a toner resin, the toner resin prepared thereby and a toner composition containing particles of the toner resin.

2. Description of the Related Art

Styrene based copolymers, particularly styrene-butadiene copolymers, have long been known to be useful as toner resins that can be used in toner compositions and developer compositions in electrostatic imaging systems. For instance, U.S. Pat. No. 4,469,770 discloses styrene-butadiene plasticizer toner composition blends comprised of from about 40 to about 94.5 weight percent of a blend of styrene-butadiene copolymer resin particles and a plasticizer composition which functions as a surfactant prior to acid coagulation. The copolymer contains from about 85 to about 93 weight percent of styrene and from about 7 to about 15 weight percent of butadiene and has a weight average molecular weight of from about 45,000 to about 155,000 and a number average molecular weight of from about 7,000 to about 25,000. In column 1 of the patent, reference is made to other patents which describe styrene-butadiene copolymers used in toner resins, namely U.S. Pat. Nos. 3,326,848, 3,960,737, and 3,766,072. Other references to styrene-butadiene copolymers as toner resins are in U.S. Pat. No. 4,,148,937 and Japanese Kokai Publication No. 53-25654.

The art has generally recognized that the molecular weight of the toner resin is an important consideration. In U.S. Pat. No. 4,558,108, a vapor phase-aqueous phase process employing multistage heating is used to prepare styrene-butadiene toner resin particles having a weight average between about 10,000 and 400,000 and a glass transition temperature of between about 50° and 130° C. The toner particles are stated as having a polydispersity up to about 9 which is contrasted with a single stage heating process that has a polydispersity of between about 2 and about 5. Other patents discussing the molecular weight of the toner resin include U.S. Pat. Nos. 4,473,628, 4,557,991, 4,565,766, 4,652,511, and 4,702,986 and Japanese Kokai Publication No. 57-5052.

U.S. Pat. No. 4,564,573 describes an electrostatic image developing toner comprised of a binder resin which contains at least 60 percent by weight of styrene-butadiene copolymer containing a component A having a molecular weight of at least 100,000 and a component B having a molecular weight of at least 500,000. U.S. Pat. No. 4,473,628 further describes a toner resin which is prepared from two different types of styrene-butadiene copolymers.

In preparing polymers which can be used as toner resins, the art has utilized a variety of materials, such as initiators and surfactants, which are used depending on the process selected. One such material is a chain transfer agent and, in this utility, the art has used mercaptans, particularly dodecyl mercaptan. For example, aforementioned U.S. Pat. Nos. 4,473,628 and 4,564,573 disclose the presence of t-dodecyl mercaptan in the polymerization initiation system for a copolymer which is predominantly prepared from styrene and butadiene.

Despite the extensive art which describes styrene-butadiene toner resins, the search has continued for efficient processes which can prepare toner resins having characteristics which make them particularly suitable in toner and developer compositions.

OBJECTS AND SUMMARY OF THE INVENTION

It is accordingly a general object of the present invention to provide an improved process for preparing a toner resin.

It is a more specific object of the present invention to provide a process for preparing a toner resin wherein the molecular weight characteristics of the resin can be controlled.

It is another object of the present invention to provide a process for preparing a toner resin wherein a single resin can be prepared having desirable molecular weight characteristics.

It is a further object of the present invention to provide a process for preparing a toner resin which uses conventional polymerization equipment.

It is a still further object of the present invention to provide an improved toner resin having advantageous molecular weight characteristics.

It is a yet further object of the present invention to provide a toner composition comprised of particles of an improved toner resin.

In one aspect, the present invention provides a process for preparing a toner resin. The process comprises polymerizing styrene and butadiene in the presence of a mixture of n-dodecyl mercaptan and t-dodecyl mercaptan in a weight ratio of from about 1:9 to about 9:1 to form said toner resin wherein said toner resin has a weight average molecular weight of from about 50,000 to about 140,000, a number average molecular weight of from about 5,000 to about 13,000 and a polydispersity of from about 5 to about 15.

In other aspects, the present invention provides a toner resin obtained by the process and a toner composition comprised of particles of the toner resin.

Further advantages and features of the present invention, as well as the scope, nature and utilization of the invention, will become apparent to those of ordinary skill in the art from the description of the preferred embodiments of the invention set forth below.

DESCRIPTION OF THE PREFERRED EMBODIMENTS

As stated hereinabove, one aspect of the present invention relates to a toner resin comprised of a copolymer of styrene and butadiene. Typically, the copolymer contains styrene in an amount from about 85 to about 97%, preferably from about 88 to about 96%, and most preferably from about 90 to about 95% by weight of the copolymer, while the butadiene is present in an amount ranging from about 3 to about 15%, preferably from about 4 to about 12% and most preferably from about 5 to about 10% by weight of the copolymer. Additional comonomers or other comonomers besides butadiene can be used to prepare the toner resin provided that the presence of such comonomers do not substantially adversely affect the advantageous properties of the toner resin. Such comonomers include, for example, acrylic acid esters, methacrylic acid esters, fumaric acid esters, maleic acid esters, vinyl esters and acrylonitrile. In general, the amount of such copolymerizable monomers is less than about 50%, preferably less than about 30%, based on the weight of the copolymer.

The toner resin of the present invention has a weight average molecular weight determined by gel permeation chromatography which is in the range of from about 50,000 to about 140,000, preferably from about 60,000 to about 120,000 and most preferably from about 70,000 to about 100,000. If the weight average molecular weight is too high, the fixing characteristics of the toner resin are adversely affected while if the weight average molecular weight is too low, the offset characteristics of the toner resin are adversely affected.

The toner resin exhibits a number average molecular weight which is also based on gel permeation chromatography that generally is in the range of from about 5,000 to about 13,000, preferably from about 6,000 to about 12,000 and most preferably from about 7,000 to about 10,000. If the toner resin exhibits a number average molecular weight which is too high, the fixing characteristics of the toner resin are adversely affected, while if the number average molecular weight is too low, the offset characteristics and caking properties of the copolymer resin are adversely affected.

In addition to the weight average molecular weight and number average molecular weight, the toner resin of the present invention must exhibit an appropriate polydispersity which is the dimensionless quotient determined by the ratio of the weight average molecular weight to the number average molecular weight. The polydispersity of the toner resin is generally in the range of from about 5 to about 15, preferably from about 6 to about 13 and most preferably from about 7 to about 10. If the polydispersity is too low, the toner resin typically exhibits a viscosity profile wherein viscosity decreases sharply at higher temperatures which is undesirable for good offsetting properties. Conversely, if the polydispersity is too high, the fixing properties of the toner resin are adversely affected.

The toner resin of the present invention advantageously further exhibits a melt index and glass transition temperature which makes it particularly suitable for use in toner compositions. More specifically, the toner resin generally has a melt index (MI, also known as the melt flow rate, determined at 150° C. and a 2160 gram load) within the range of from about 5 to about 80 g/10 minutes, preferably from about 10 to about 60 g/10 minutes and most preferably from about 15 to about 40 g/10 minutes. The glass transition temperature (Tg) of the toner resin, as determined by a differential scanning calorimeter, is generally in the range from about 50° to about 70° C., preferably from about 55° to about 65° C. and most preferably from about 57° to about 63° C.

The toner resin of the present invention which exhibits the foregoing characteristics is obtained in accordance with the present invention by conducting polymerization of the copolymerizable monomers in the presence of a mixture of n-dodecylmercaptan and t-dodecylmercaptan (both of which are commercially available). The polymerization can be conducted according to known suspension or emulsion polymerization techniques with emulsion polymerization being preferred. The weight ratio of n-dodecylmercaptan to t-dodecylmercaptan is generally from about 10:90 to about 90:0, preferably from about 20:80 to about 80:20, and most preferably from about 30:70 to about 70:30. The total amount of the dodecylmercaptans is from about 0.5 to about 6% by weight, preferably from about 1 to about 5% by weight and most preferably from about 1.5 to about 4% by weight of the copolymerizable monomers.

It is believed that the diverse chain transfer coefficients and diffusion rates of the n-dodecylmercaptan and t-dodecylmercaptan enable a toner resin to be obtained which has the aforementioned advantageous characteristics. However, it is to be understood that the present invention is not limited by this theory.

By using the mixture of n- and t-dodecylmercaptan, a toner resin that has the noted advantageous characteristics in a single reaction operation can be obtained without requiring equipment necessary for multiphase processing. Furthermore, the need to employ two different polymers in order to obtain a mixture having the desired characteristics can be obviated. Such advantageous results, which cannot be obtained by using either the n-dodecylmercaptan or t-dodecylmercaptan alone, mark a significant advance in the art.

The toner resin of the present invention may be prepared otherwise using conventional polymerization ingredients and techniques known to those of ordinary skill in the art. For example, emulsion polymerization can be conducted by using a standard stainless steel reactor equipped with an agitator which is charged with distilled water, an alkaline agent, such as sodium hydroxide, in order to adjust the pH to from about 9 to about 11, and one or more emulsion stabilizing surfactants such as sodium lauryl sulfate, sodium oleate, a wood resin derivative commercially available under the tradename Dressinate, and sodium stearate. After the contents of the reactor are heated to obtain a solution, an initiator such as sodium persulfate, potassium persulfate, ammonium persulfate in an amount of from about 0.1 to about 1% by weight of the monomer charge can be added followed by the addition of a mixture of the styrene and the n- and t-dodecylmercaptan. The reactor can then be evacuated and charged with nitrogen in order to remove oxygen from the system. Thereafter, butadiene is introduced into the reactor and, upon completion of the butadiene addition, the temperature is increased to from about 50° to about 80° C. for from about 3 to about 8 hours.

In the interest of process efficiency, the contents of the reactor can then be transferred to a coagulation vessel and a coagulating solution containing a conventional coagulating agent in an amount of from about 0.1 to about 2% by weight of the initial monomer charge is added. The coagulating agent can be a mineral acid, such as sulfuric acid, or a mineral acid salt, such as calcium chloride, aluminum sulfate or calcium nitrate, with calcium chloride being preferred.

After a period of agitation, the coagulated mixture is then filtered and dried in any known manner in order to recover the resin.

Depending on the styrene-butadiene ratio, the initiator, the surfactant, pH, reaction temperature and/or the coagulating agent selected, a different ratio of the n- and t-dodecyl mercaptan or total amount of the mercaptans within the defined ranges may be needed in order to obtain a resin with the desired characteristics. However, such determination can be readily determined by those of ordinary skill in the art. Additionally, other known ingredients can be used in the process, including other chain transfer agents, as long as they do not adversely affect the aforementioned characteristics of the toner resin.

The toner resin of the present invention can be used with known ingredients in order to prepare a toner composition that can be used in electrostatic imaging systems. For instance, the toner resin can be combined with known pigments, dyes, charge control agents, etc. under known processing conditions (e.g., mixing and polymerizing) in order to obtain toner compositions that can be used in electrostatic imaging systems. Such materials and techniques of forming toner compositions are, for example, set forth in the aforementioned documents, especially U.S. Pat. Nos. 4,473,628, 4,469,770, 4,564,573, the entire contents of such documents being incorporated by reference. Similarly, the toner resins can be combined with such known materials and carrier particles of various types in order to obtain developer compositions that can be used in a manner well known to those skilled in the art.

The following inventive Examples and Comparative Examples are presented to illustrate and contrast the present invention. However, the Examples should not be construed as limiting the invention.

In Examples 1–8 and Comparative Examples 1–4, the following general procedure was used.

A soap solution is prepared by dissolving sodium hydroxide (0.88 g), sodium dodecyl sulfate (0.88 g), Dressinate or sodium oleate (21.6 g) in 740 g of deionized water at 45° to 50° C. The soap solution is cooled to 25° C. and charged to a 2 liter, stainless steel, stirred pressure reactor. A mixture of styrene (372 g for Examples 3, 4, 5, 6, 7, and 8 and Comparative Example 4; 360 g for Examples 1 and 2 and Comparative Examples 1, 2, and 3), n-dodecyl mercaptan, and t-dodecyl mercaptan and a solution of 3.6 g of sodium persulfate dissolved in 20 ml of deionized water are charged to the reactor.

The reactor head is bolted to the reactor. The heating, cooling, and agitation utilities are connected to the reactor. Oxygen is purged from the reactor by alternately applying vacuum and nitrogen pressure to the reactor. After five cycles vacuum is applied to the reactor. The reactor agitator is turned on and butadiene (28 g for Examples 3, 4, 5, 6, 7 and 8 and Comparative Example 4 and 40 g for Examples 1 and 2 and Comparative Examples 1, 2, and 3) is charged under nitrogen pressure to the reactor from a 300 ml stainless steel cylinder with valves at both ends.

The reaction mixture is heated to 55° C. over a period of 20 minutes and held at this temperature for 3.5 hours. The conversion of styrene to polymer is about 99% under these reaction conditions. To increase the conversion of styrene to polymer to >99.9% the reaction temperature is increased to 80° C. for one hour after the 3.5 hour hold at 55° C. The reaction mixture is cooled to 35° to 40° C., and vented to atmospheric pressure. The reactor head is then removed.

The contents of the pressure reactor are added over 20 to 30 minutes to a stirred coagulation solution that contains 4000 g of water and 6 g of coagulant. The coagulation solution is held at 50° to 60° C. during the addition. The coagulation mixture is stirred for 20 minutes and then filtered. The toner resin is washed with 2000 g of water and then dried at 45° to 55° for 16 hours.

The molecular weight is determined by gel permeation chromatography at 40° C. on four 7.5 by 300 mm columns with pore sizes of 500, 1000, 10000, and 100000 angstroms. The carrier solvent is tetrahydrofuran at a flow rate of 1 ml/minute. Detection is by ultraviolet at 220 nm. The column set is calibrated with polystyrene calibration standards.

The melt index of the toner resin is measured in accordance with ASTM Method D 1238 (Procedure B) at a temperature of 150° C. and a load of 2160 g.

The glass transition temperature of the toner resin is determined by differential scanning calorimetry wherein 10 to 15 mg of toner resin is heated from 25° to 200° C. at a rate of 10° C./minute. The sample is cooled to 10° C. at a rate of 200° C./minute and held at 10° C. for 5 minutes. The sample is heated to 25° C. and held at this temperature for 3 minutes. The sample is then heated from 25° to 200° C. at a rate of 10° C./minute. The glass transition temperature is calculated from the second scan.

The styrene-butadiene ratio, surfactant, coagulating agent and the amount of n- and t-dodecyl mercaptan used in each Example are provided in Table 1 and Table 2 along with the test results.

TABLE 1

| Example | Styrene/Butadiene Ratio | Surfactant | n-DM (%) | t-DM (%) | MW × 10³ Mw | Mn | Mw/Mn | MI | Tg °C. |
|---|---|---|---|---|---|---|---|---|---|
| EX 1 | 90/10 | Sodium Oleate | 1.3 | 0.4 | 96 | 11 | 8.7 | 12.3 | 53.6 |
| EX 2 | 90/10 | Wood Rosin | 1.3 | 1.3 | 85 | 10 | 8.5 | 25.1 | 50.7 |
| EX 3 | 93/7 | Wood Rosin | 1.3 | 1.3 | 92 | 12 | 7.7 | 16.6 | 63.5 |
| EX 4 | 93/7 | Wood Rosin | 1.5 | 1.5 | 65 | 9 | 7.2 | 29.1 | 63.1 |
| EX 5 | 93/7 | Wood Rosin | 2.0 | 2.0 | 59 | 8 | 7.4 | 66.4 | 58.7 |
| COMP1 | 90/10 | Wood Rosin | 0.4 | — | 161 | 13 | 12.4 | NF | 60.5 |
| COMP2 | 90/10 | Wood Rosin | 1.3 | — | 94 | 6 | 15.7 | NF | 55.5 |
| COMP3 | 90/10 | Wood Rosin | 1.3 | 0.4 | 151 | 13 | 11.6 | 1.3 | 54.6 |
| COMP4 | 93/7 | Wood Rosin | — | 1.3 | 63 | 15 | 4.2 | 11.1 | 72.8 | t-DM = t-dodecyl mercaptan
n-DM = n-dodecyl mercaptan
wood rosin = Dressinate 731
MI reported in g/10 minutes and is determined at 150° C. and 2160 g load
NF = No flow at the test conditions
The coagulating agent is calcium chloride for all the Examples and Comparative Examples

TABLE 2

| Example | Coagulant | Styrene/Butadiene Ratio | n-DM (%) | t-DM (%) | MW × 10³ Mw | Mn | Mw/Mn | MI | Tg |
|---|---|---|---|---|---|---|---|---|---|
| EX 6 | CaCl₂ | 93/7 | 1.33 | 1.33 | 62.7 | 6.6 | 9.5 | 25 | 62.6 |
| EX 7 | Al₂(SO₄)₃ | 93/7 | 1.33 | 1.33 | 63.5 | 7.6 | 8.4 | 36.4 | 60.6 |

TABLE 2-continued

| Example | Coagulant | Styrene/Butadiene Ratio | n-DM (%) | t-DM (%) | MW × 10³ Mw | Mn | Mw/Mn | MI | Tg |
|---|---|---|---|---|---|---|---|---|---|
| EX 8 | $H_2SO_4$ | 93/7 | 1.33 | 1.33 | 67.1 | 7.3 | 9.2 | 50.9 | 59.9 |

Examples 6, 7 and 8 are from the same polymerization reaction. The surfactant used in Examples 6, 7, and 8 is Dressinate 731.

We claim:

1. A process for preparing a toner resin comprising polymerizing styrene and butadiene in a weight ratio of styrene to butadiene of from about 85:15 to about 97:3 in the presence of a mixture of n-dodecyl mercaptan and t-dodecyl mercaptan in a weight ratio of from about 1:9 to about 9:1 to form said toner resin wherein said toner resin has a weight average molecular weight of from about 50,000 to about 140,000, a number average molecular weight of from about 5,000 to about 13,000, a polydispersity of from about 5 to about 15 and a melt index of from about 5 to about 80 g/10 min.

2. The process of claim 1 wherein the toner resin has a weight average molecular weight of from about 60,000 to about 120,000, a number average molecular weight of from about 6,000 to about 12,000 and a polydispersity of from about 6 to about 13.

3. The process of claim 2 wherein the toner resin has a weight average molecular weight of from about 70,000 to about 100,000, a number average molecular weight of from about 7,000 to about 10,000 and a polydispersity of from about 7 to about 10.

4. The process of claim 1 wherein the toner resin has a melt index in the range of from about 10 to about 60 g/10 min.

5. The process of claim 4 wherein the toner resin has a melt index in the range of from about 15 to about 40 g/10 min.

6. The process of claim 1 wherein the toner resin has a glass transition temperature in the range of from about 50° to about 70° C.

7. The process of claim 6 wherein the toner resin has a glass transition temperature in the range of from about 55° to about 65° C.

8. The process of claim 7 wherein the toner resin has a glass transition temperature in the range of from about 57 to about 63° C.

9. The process of claim 1 wherein the total weight of n-dodec mercaptan and t-dodecyl mercaptan is from about 0.5 to about 6% by weight of the total weight of the styrene and butadiene.

10. The process of claim 1 wherein upon completion of the reaction, a coagulating agent is added.

11. The process of claim 10 wherein the coagulating agent is a mineral acid or a salt thereof.

12. The process of claim 11 wherein the salt is selected from the group consisting of calcium chloride, aluminum sulfate and calcium nitrate.

13. The process of claim 12 wherein the coagulating agent is calcium chloride.

14. The process of claim 1 wherein the reaction is conducted in the presence of a surfactant.

15. The process of claim 1 wherein the weight ratio of styrene to butadiene is from about 88:12 to about 96:4.

16. The process of claim 15 wherein the weight ratio of styrene to butadiene is from about 90:10 to about 95:5.

17. The process of claim 1 wherein the styrene and butadiene are emulsion polymerized.

* * * * *

UNITED STATES PATENT AND TRADEMARK OFFICE
CERTIFICATE OF CORRECTION

PATENT NO. : 5,206,319

DATED : April 27, 1993

INVENTOR(S) : Kobayashi et al.

It is certified that error appears in the above-identified patent and that said Letters Patent is hereby corrected as shown below:

Column 8, line 17, amend "57" to --57°--.

Column 8, line 19, amend "n-dodec" to --n-dodecyl--.

Signed and Sealed this

Thirty-first Day of May, 1994

Attest:

BRUCE LEHMAN

*Attesting Officer*  *Commissioner of Patents and Trademarks*